US011962515B2

(12) United States Patent
Benzaoui et al.

(10) Patent No.: US 11,962,515 B2
(45) Date of Patent: Apr. 16, 2024

(54) DETERMINISTIC COMMUNICATIONS VIA PACKET-SWITCHED NETWORKS

(71) Applicant: Nokia Solutions and Networks Oy, Espoo (FI)

(72) Inventors: Nihel Djoher Benzaoui, Paris (FR); Guillaume Pierre Fernand Soudais, Meudon (FR); Sebastien Bigo, Massy (FR)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 17/682,203

(22) Filed: Feb. 28, 2022

(65) Prior Publication Data
US 2023/0275852 A1   Aug. 31, 2023

(51) Int. Cl.
*H04L 12/66* (2006.01)
*H04J 3/06* (2006.01)
*H04L 49/253* (2022.01)

(52) U.S. Cl.
CPC .......... *H04L 49/253* (2013.01); *H04J 3/0661* (2013.01)

(58) Field of Classification Search
CPC ..... H04L 49/253; H04L 49/606; H04L 12/66; H04L 12/56
See application file for complete search history.

(56) References Cited

U.S. PATENT DOCUMENTS

| 7,242,686 B1* | 7/2007 | Dougherty ............ H04L 49/106 370/498 |
| 7,535,893 B1* | 5/2009 | Beladakere ........... H04L 49/606 370/442 |
| 7,649,883 B2* | 1/2010 | Sproat ................. H04L 12/5601 370/432 |
| 8,773,996 B2 | 7/2014 | English et al. |
| 2003/0152055 A1* | 8/2003 | Aragones ............... H04W 88/06 370/395.53 |

(Continued)

FOREIGN PATENT DOCUMENTS

| EP | 0437072 A1 | 7/1991 |
| EP | 1576770 B1 | 2/2012 |

OTHER PUBLICATIONS

Benzaoui, Nihel, et al. "DDN: Deterministic Dynamic Networks." 2018 European Conference on Optical Communication (ECOC). Rome, Italy. Sep. 23-27, IEEE (2018): 1-3.

(Continued)

*Primary Examiner* — Abdelnabi O Musa
(74) *Attorney, Agent, or Firm* — Mendelsohn Dunleavy, P.C.; Steve Mendelsohn

(57) ABSTRACT

In certain embodiments, a communication network has a specialized ingress node that converts one or more incoming flows into a single, packetized, time-division multiplexed (TDM) flow; a switch fabric that routes the TDM flow via a fixed path through the switch fabric in a contention-free manner; and a specialized egress node that converts the TDM flow received from the switch fabric into one or more outgoing flows corresponding to the one or more incoming flows. The technology turns legacy, best-effort packet-switching into deterministic circuit-switching for a programmable selection of flows with minimal impact on network dynamics and at relatively low cost.

20 Claims, 9 Drawing Sheets

(56) References Cited

U.S. PATENT DOCUMENTS

| | | | | |
|---|---|---|---|---|
| 2003/0152057 A1* | 8/2003 | Chou | H04W 88/06 370/338 |
| 2005/0220059 A1* | 10/2005 | DelRegno | H04L 47/10 370/337 |
| 2006/0133350 A1* | 6/2006 | Lowmaster | H04M 3/42314 370/352 |
| 2007/0006229 A1* | 1/2007 | Moore | H04L 47/50 718/100 |
| 2008/0240169 A1* | 10/2008 | Cui | H04J 3/0664 370/516 |
| 2011/0044202 A1* | 2/2011 | Toscano | H04L 12/6402 370/458 |
| 2013/0028272 A1* | 1/2013 | Tohda | H04J 3/0632 370/516 |
| 2014/0301398 A1* | 10/2014 | English | H04M 7/0078 370/392 |
| 2014/0321853 A1* | 10/2014 | Beshai | H04J 14/0284 398/52 |

OTHER PUBLICATIONS

Benzaoui, Nihel, et al. "DDX Add-On Card: Transforming Any Optical Legacy Network into a Deterministic Infrastructure." 2021 European Conference on Optical Communication (ECOC). Bordeaux, France. Sep. 13-16, IEEE (2021): 1-4.

Bigo, Sébastien, et al. "Dynamic Deterministic Digital Infrastructure for Time-Sensitive Applications in Factory Floors." IEEE Journal of Selected Topics in Quantum Electronics 27.6 (2021): 1-14.

El-Banna, Dalia, et al. "Evaluation of New Dynamic Time Division Multiplexing Protocol for Real-Time Traffic over Converged Networks." 2018 IEEE 6th International Conference on Future Internet of Things and Cloud (FiCloud). Barcelona, Spain. Aug. 6-8, IEEE, (2018): 282-287.

IEEE, "Bridges and Bridged Networks—Amendment 25: Enhancements for Scheduled Traffic." IEEE Standard 802.1Qbv-2015 (Mar. 2016): 1-55.

* cited by examiner

DETERMINISTIC COMMUNICATIONS VIA PACKET-SWITCHED NETWORKS

BACKGROUND

Field of the Disclosure

The present disclosure relates to communications and, more specifically, to low-latency communications on packet-switched networks.

Description of the Related Art

This section introduces aspects that may help facilitate a better understanding of the disclosure. Accordingly, the statements of this section are to be read in this light and are not to be understood as admissions about what is prior art or what is not prior art.

5G and beyond time-sensitive applications require hard (deterministic) performance guarantees in an environment where the traffic is highly volatile (dynamic). Packet-switched networks, natively dynamic and widely deployed, were originally designed to carry best-effort traffic. Many efforts have been deployed in order to turn a packet-switched network into a low-latency network to enable time-sensitive applications.

Despite prior-art mechanisms and protocols proposed for packet-switched networks, they can currently at best provide low average latency but not deterministic performance (controlled latency). Prior-art virtual circuit-switched networks, such as Time Division Multiplexing (TDM) networks, are known for their ability to deliver deterministic performance, since network resources are dedicated for a given traffic during a given time. However, they present the drawback of slow reconfiguration and coarse resource reservation granularity.

Time-Sensitive Networking (TSN) is a set of standards aimed at transforming packet-based networks (ethernet switches) into deterministic switching nodes. TSN 802.Qbv introduces a TDM port gating and a global scheduler to handle time-slot reservations. This solution requires 1) a strict synchronization across all the switches, 2) a complex scheduler, and 3) replacement of all of the existing hardware (packet-switching nodes).

SUMMARY

Problems in the prior art are addressed in accordance with the principles of the present disclosure by providing technology for turning legacy, best-effort packet-switching into deterministic circuit-switching for a programmable selection of flows with minimal impact on network dynamics and at relatively low cost.

One embodiment is a communication network comprising a specialized ingress node that converts one or more incoming flows into a single, packetized, time-division multiplexed (TDM) flow; a switch fabric that routes the TDM flow via a fixed path through the switch fabric in a contention-free manner; and a specialized egress node that converts the TDM flow received from the switch fabric into one or more outgoing flows corresponding to the one or more incoming flows.

BRIEF DESCRIPTION OF THE DRAWINGS

Embodiments of the disclosure will become more fully apparent from the following detailed description, the appended claims, and the accompanying drawings in which like reference numerals identify similar or identical elements.

DETAILED DESCRIPTION

Detailed illustrative embodiments of the present disclosure are disclosed herein. However, specific structural and functional details disclosed herein are merely representative for purposes of describing example embodiments of the present disclosure. The present disclosure may be embodied in many alternate forms and should not be construed as limited to only the embodiments set forth herein. Further, the terminology used herein is for the purpose of describing particular embodiments only and is not intended to be limiting of example embodiments of the disclosure.

As used herein, the singular forms "a," "an," and "the," are intended to include the plural forms as well, unless the context clearly indicates otherwise. It further will be understood that the terms "comprises," "comprising," "contains," "containing," "includes," and/or "including," specify the presence of stated features, steps, or components, but do not preclude the presence or addition of one or more other features, steps, or components. It also should be noted that in some alternative implementations, the functions/acts noted may occur out of the order noted in the figures. For example, two figures shown in succession may in fact be executed substantially concurrently or may sometimes be executed in the reverse order, depending upon the functions/acts involved.

Figure 1:
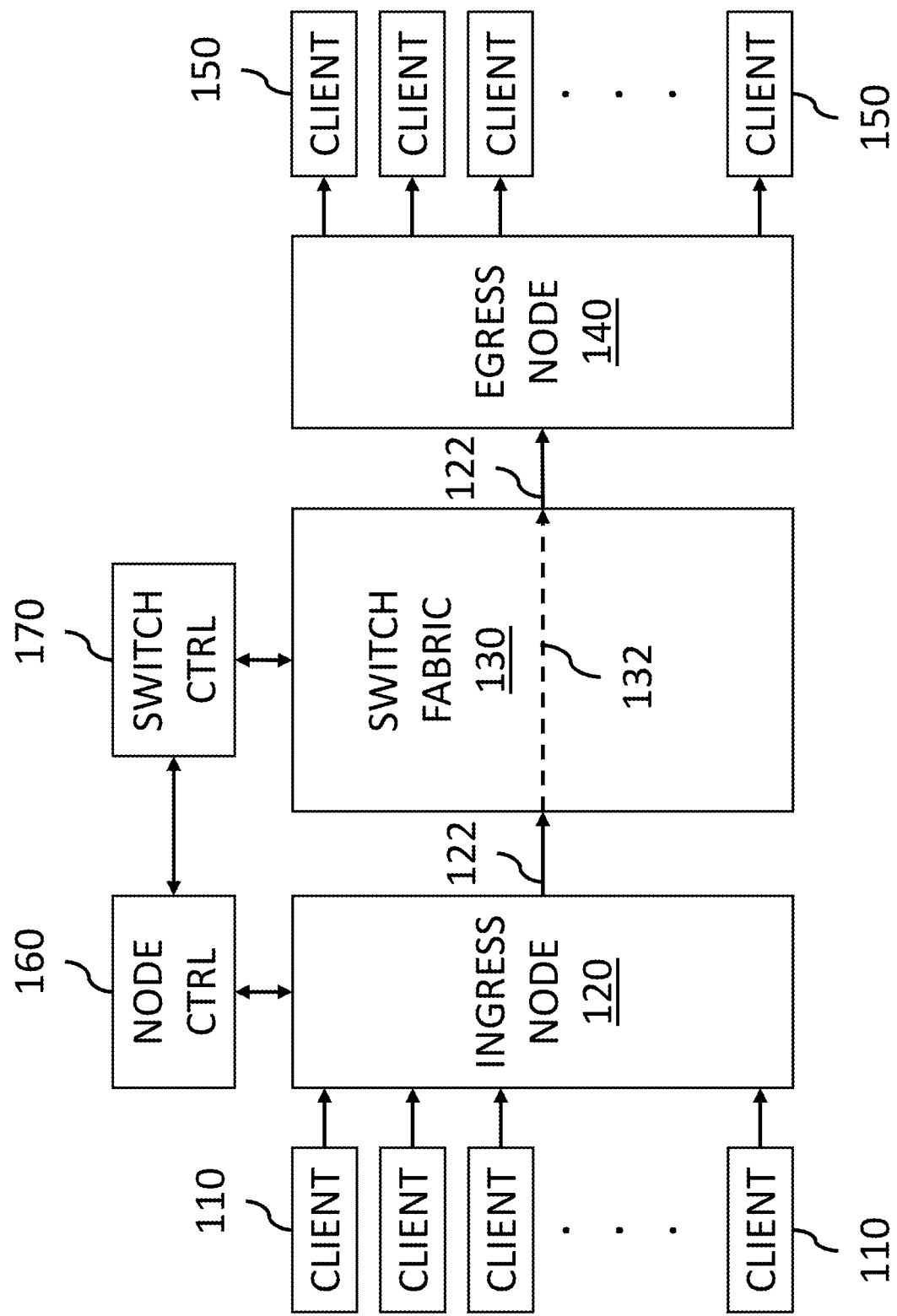
FIG. 1 is a block diagram of a communication network according to certain embodiments of the present disclosure.

FIG. 1 is a block diagram of a communication network 100 according to certain embodiments of the present disclosure. In some implementations, switch fabric 130 is a conventional packet-switched mesh network of switches (not shown in FIG. 1) that support a plurality of concurrent packet-based flows via paths through the mesh network between pairs of edge switches. FIG. 1 depicts just one of those flows 122 via one of those paths 132.

In particular, flow 122 is from an output port of specialized ingress node 120 to an input port of specialized egress node 140. In some implementations, each specialized node 120/140 is located at the interface between one or more client flows 110/150 and the switch fabric 130. In particular, ingress node 120 is locally (e.g., electrically, wirelessly, or optically) connected to one or more client flows 110 which send data packets that need to be transported through the network 100 with a high quality of service. The ingress node 120 is also locally connected to the switch fabric 130 at an output port of the ingress node. The egress node 140 is locally connected to the switch fabric 130 at an input port of the egress node. The egress node 140 is also locally connected to one or more outgoing client flows 150 corresponding to the incoming client flows 110.

The ingress node 120 converts a number of different incoming client flows 110 into a single, packetized, time-division multiplexed (TDM) flow 122 that is routed from an output port of the ingress node 120 via a fixed path 132 through the switch fabric 130 to an input port of the egress node 140, which recovers, from the received TDM flow 122, a corresponding number of outgoing client flows 150. The act of converting one or more incoming flows into a single TDM flow is referred to as "TDMizing" those one or more incoming flows.

In the particular example embodiments described with reference to the figures, the incoming and outgoing client flows 110 and 150 are both assumed to be Ethernet client flows, where each incoming Ethernet packet is TDMized into a TDM packet for a different time slot in the TDM flow 122. Those skilled in the art will understand that other implementations may be able to TDMize two or more different incoming Ethernet packets from the same client flow 110 into a single TDM packet. Furthermore, other implementations may involve other types of time-sensitive incoming and outgoing client flows including other types of packetized data as well as non-packetized (e.g., circuit-switched) data. For example, the client flows could be constant bitstreams, in which case, the ingress and egress nodes would provide transport of serial data in a packetized network.

As described further below, the ingress and egress nodes 120 and 140 process the client flows to ensure deterministic communication through the switch fabric 130. As used herein, the term "deterministic" means that the jitter associated with the communication is guaranteed to be maintained to within a specified range, where jitter refers to the temporal variation in the latency (i.e., time delay) of the flows through the switch fabric. As opposed to a deterministic flow, a best-effort flow is one for which no such jitter threshold is guaranteed.

In particular, the ingress node 120 services each incoming client flow 110 according to a schedule by converting each set of one or more packets of incoming client data into a TDM packet that is transmitted in a time slot of the TDM flow 122, where each time slot has a single TDM packet. As described further below, in some implementations, if a TDM packet does not fill its time slot, then the switch fabric 130 may use the remaining, unused, tail portion of that time slot for best-effort traffic from other clients. Note that, since any such best-effort traffic will be inserted at a node of the switch fabric 130 and removed at another node of the switch fabric 130, the ingress and egress nodes 120 and 140 need not be aware of the existence of that best-effort traffic. The egress node 140 converts each TDM packet in the received TDM flow 122 back into a corresponding set of one or more packets of outgoing client data for the corresponding outgoing client flow 150.

Those skilled in the art will understand that, although not shown in FIG. 1, network 100 may have one or more other pairs of ingress and egress nodes providing concurrent deterministic TDMized flows through the switch fabric 130, which may also concurrently support one or more best-effort flows between different pairs of edge switches. Furthermore, in some implementations, each ingress node 120 and each egress node 140 can support multiple, concurrent TDM flows. In some implementations, a specialized node may concurrently function as an ingress node 120 for one or more TDM flows and as an egress node 140 for one or more other TDM flows.

In some implementations, the ingress node 120 is a programmable device that can support a variety of different scheduling algorithms, each of which determines the sequence of servicing the various incoming client flows 110. In that case, node controller 160 is responsible for programming the ingress node 120 to implement a particular scheduling algorithm. Note that, in some implementations, the egress node 140 determines which outgoing client flow 150 corresponds to each TDM packet in the received TDM flow 122 based on information contained in the TDM packet. In that case, the egress node 140 does not have to be explicitly programmed with the scheduling algorithm used by the ingress node 120.

As shown in FIG. 1, network 100 also has a switch controller 170, which controls the switches in the switch fabric 130 to provide the path 132 from the ingress node 120 to the egress node 140 as well as the other concurrent paths through the switch fabric 130 for the other deterministic and/or best-effort communications supported by the switch fabric 130. In order for the TDM flow 122 to be deterministic, the corresponding path 132 through the switch fabric 130 is fixed for the duration of the TDM flow 122, where "fixed" means that the same set of switches is used for the duration of the TDM flow 122, with each switch providing constant input/output (I/O) bridging. In order to establish the TDM flow 122, the node controller 160 communicates with the switch controller 170 to (i) identify the switch fabric output port associated with the input port of the egress node 140 and (ii) request a fixed path 132 through the switch fabric 130 from the switch fabric input port associated with the ingress node 120 to the switch fabric output port associated with the egress node 140, where the switch controller 170 determines and configures the set of switches to provide that fixed path 132.

Figure 2:
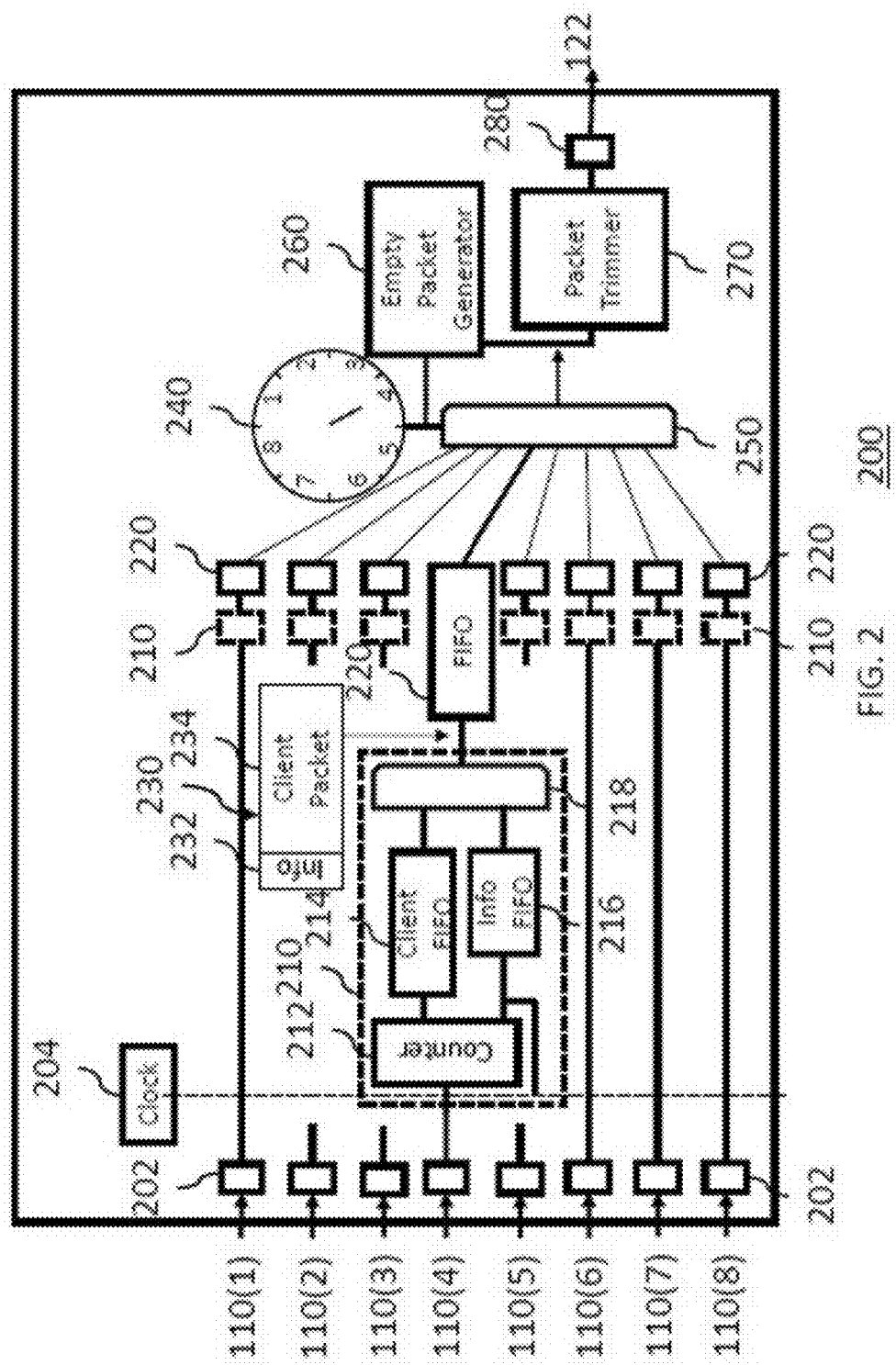
FIG. 2 is a block diagram of an ingress node according to one possible implementation of the ingress node of FIG. 1.

FIG. 2 is a block diagram of an ingress node 200 according to one possible implementation of the ingress node 120 of FIG. 1. In this particular implementation, the ingress node 200 is capable of TDMizing up to eight different incoming client flows 110(1)-110(8) into the single TDM flow 122. Those skilled in the art will understand that other implementations may support fewer or more incoming client flows 110.

As shown in FIG. 2, the ingress node 200 has eight different input ports 202, one of each of the eight different possible incoming client flows 110. FIG. 2 shows the details of the functional elements 210-220 associated with TDMizing the client data associated with the fourth client flow 110(4). Although not explicitly depicted in detail in FIG. 2, it will be understood that analogous instances of the functional elements 210-220 exist for each of the other seven client flows 110 as well.

With regard to the fourth client flow 110(4), as a current client (Ethernet) packet arrives at the corresponding input port 202 of the ingress node 200, clock 204 generates a current timestamp, and counter 212 determines the size of the current client packet as the client packet is stored in client data first-in, first-out (FIFO) buffer 214. The current timestamp from the clock 204 and the packet size from the counter 212 are stored in node information (info) buffer 216 along with an inter-packet gap value (not shown in FIG. 2) that represents the difference between the current timestamp and the previous timestamp associated with the previous incoming client packet from the fourth client flow 110(4). In one possible implementation, each set of node info comprises a 12-bit packet length value, a 20-bit timestamp value, and a 20-bit inter-packet gap value. In other implementations, other field sizes and/or additional and/or alternative node info are possible.

Multiplexer 218 prepends the node info from the node info buffer 216 to the client packet from the client data buffer 214 to form a node packet 230 (having a node header 232 comprising the node info and a node payload 234 comprising the client packet). The node packet 230 is stored in node packet FIFO buffer 220.

Note that, in some implementations, the ingress node 200 can include one or more incoming client packets from a single incoming client flow 110 in a single TDM packet. Furthermore, the ingress node 200 can truncate an incoming client packet if there is not enough room in the TDM packet, in which case, the remainder of that truncated client packet would be transmitted as the first client packet in the next TDM packet for that same incoming client flow 110.

Scheduler 240 implements the scheduling algorithm selected by the node controller 160 of FIG. 1. Those skilled in the art will understand that the selected scheduling algorithm determines the sequence with which the ingress node 120 services the different client flows 110. For the present description, the selected scheduling algorithm is assumed to be a simple round-robin algorithm in which the eight client flows 110(1)-110(8) get repeatedly serviced one at a time from 1 to 8. Those skilled in the art will understand that many other scheduling sequences are possible and typically depend on the relative volume of data in the various client flows 110.

Whether or not the ingress node 200 has client data available for the next TDM time slot, the ingress node 200 generates a TDM packet for each time slot in the TDM flow 122. In particular, empty packet generator 260 generates an empty TDM packet for the next time slot, where "empty" means that the TDM packet has a TDM packet header and a node header but no data in the node payload. When the scheduler 240 determines that it is the fourth client flow 110(4)'s turn to be serviced, if the node packet buffer 220 has a node packet available, then multiplexer 250 forwards that node packet to be inserted into the payload of the empty TDM packet. If there is no node packet available in the node packet buffer 220, then the TDM packet payload will remain without data.

Note that, in some implementations of the ingress node 200, if there are fewer than eight incoming client flows 110 present at the input ports 202, then the scheduling algorithm still ensures that empty TDM packets will be generated for the "missing" incoming client flows 110. For example, in these implementations, if the incoming client flows 110(3) and 110(6) do not exist at the ingress node 200, then a round-robin scheduling algorithm will still service the node packet buffers 220 for all eight client flows such that the time slots in the TDM flow 122 associated with the missing incoming client flows 110(3) and 110(6) will always contain empty TDM packets. As explained further below, some or all of these empty TDM packets can be replaced by non-empty TDM packets at one or more specialized intermediate nodes located along the path 132.

In other implementations of the ingress node 200, the scheduling algorithm ensures that TDM packets will be generated only for existing incoming client flows. For example, in these implementations, if the incoming client flows 110(3) and 110(6) do not exist at the ingress node 200, then the round-robin scheduling algorithm will service the node packet buffers 220 for only the incoming client flows 110(1)-110(2), 110(4)-110(5), and 110(7)-110(8) such that no time slots in the TDM flow 122 will be associated with the missing incoming client flows 110(3) and 110(6). Note that a time slot for an existing incoming client flow 110 will still have an empty TDM packet if and when there is no node packet available when the scheduler 240 determines that it is time to service that particular incoming client flow 110. Those skilled in the art will understand that hybrids of these two different types of implementations are also possible where one or more missing incoming client flows 110 are represented in the TDM flow 122 by empty TDM packets, while one or more other missing incoming client flows 110 are not so represented.

Whether or not the TDM packet for the next TDM time slot is empty, the TDM packet is applied to packet trimmer 270, which reduces the size of the TDM packet payload according to the actual amount of data to be transmitted in that payload. This applies to empty TDM packets having no payload data as well as non-empty TDM packets where the size of the corresponding node packet is smaller than the maximum size of the TDM packet payload. This packet trimming is implemented for those embodiments of communication network 100 that enable the switch fabric 130 to fill in unused tail portions of the TDM time slots with best-effort traffic. For those embodiments that do not support this function, packet trimmer 270 may be omitted.

In any case, the resulting TDM packet is presented at output port 280 for transmission in the next time slot in the TDM flow 122.

Figure 3:
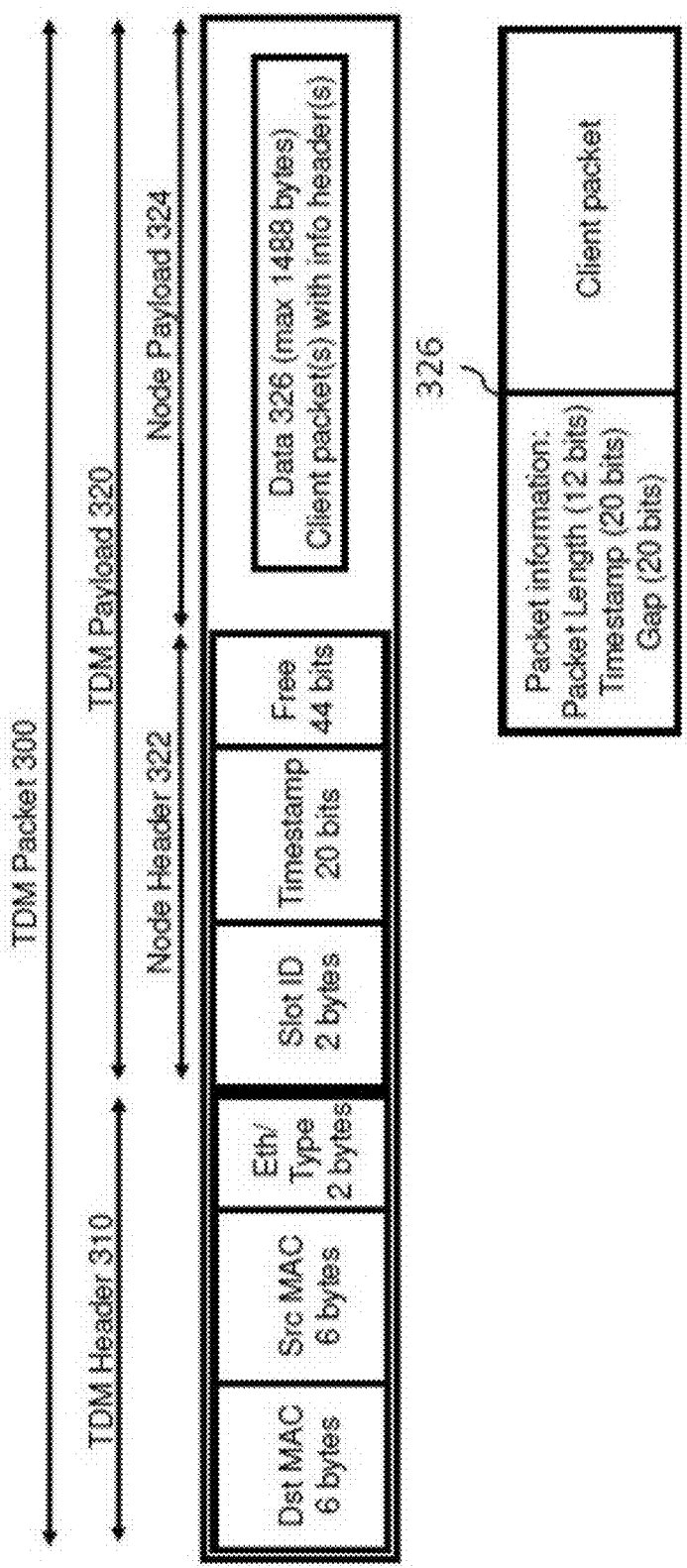
FIG. 3 is a diagram illustrating the format of a TDM packet generated by the ingress node of FIG. 2.

FIG. 3 is a diagram illustrating the format of a TDM packet 300 generated by the ingress node 200 of FIG. 2 according to one possible Ethernet implementation. In this implementation, the 1512-byte TDM packet 300 comprises a 14-byte TDM header 310 and a TDM payload 320 comprising a 10-byte node header 322, and a node payload 324 having up to 1488 bytes. The TDM header 310 comprises:

A 6-byte destination media access control (MAC) address field identifying the MAC address of the egress node 140;

A 6-byte source MAC address identifying the MAC address field of the ingress node 120; and A 2-byte field for compliance with the Ethernet protocol (e.g., 0x88B5 Experimental Ethernet).

The node header 320 comprises:

A 2-byte Slot ID field identifying the time slot in the TDM flow 122;

A 20-bit Timestamp field identifying the timestamp for the TDM packet 300; and 44 reserved bits.

For an empty TDM packet, the node payload 324 is empty. For a non-empty TDM packet, the node payload 324 comprises one or more pre-pended client packets 326, where each pre-pended client packet 326 comprises:

A 12-bit Packet Length field identifying the length of the client packet;

A 20-bit Timestamp field identifying the arrival time of the client packet at the ingress node 120;

A 20-bit Gap field identifying a time delay from the previous packet in the same incoming client flow 110; and The client packet.

Figure 4:
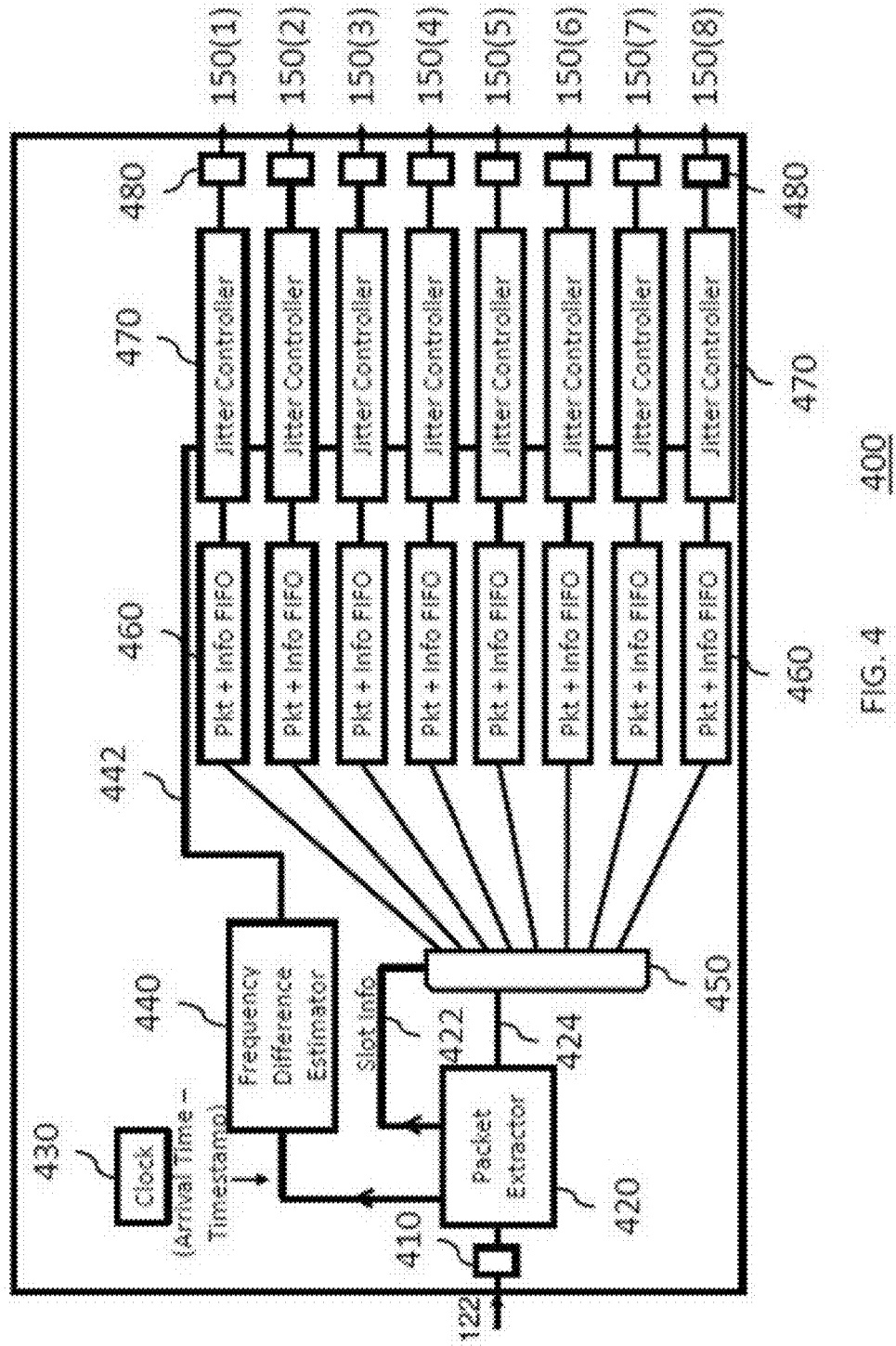
FIG. 4 is a block diagram of an egress node according to one possible implementation of the egress node of FIG. 1.

FIG. 4 is a block diagram of an egress node 400 according to one possible implementation of the egress node 140 of FIG. 1. In this particular implementation, the egress node 400 is capable of recovering up to eight different outgoing client flows 150(1)-150(8) from the TDM flow 122 generated by the ingress node 200 of FIG. 2. Those skilled in the art will understand that other implementations may support fewer or more outgoing client flows 150.

As shown in FIG. 4, the TDM packet associated with the current time slot in the TDM flow 122 is applied at input port 410. The packet extractor 420 extracts the timestamp from the node header of the TDM packet and applies the difference between the arrival time of the TDM packet from local clock 430 and the extracted timestamp to frequency difference estimator 440.

Figure 5:
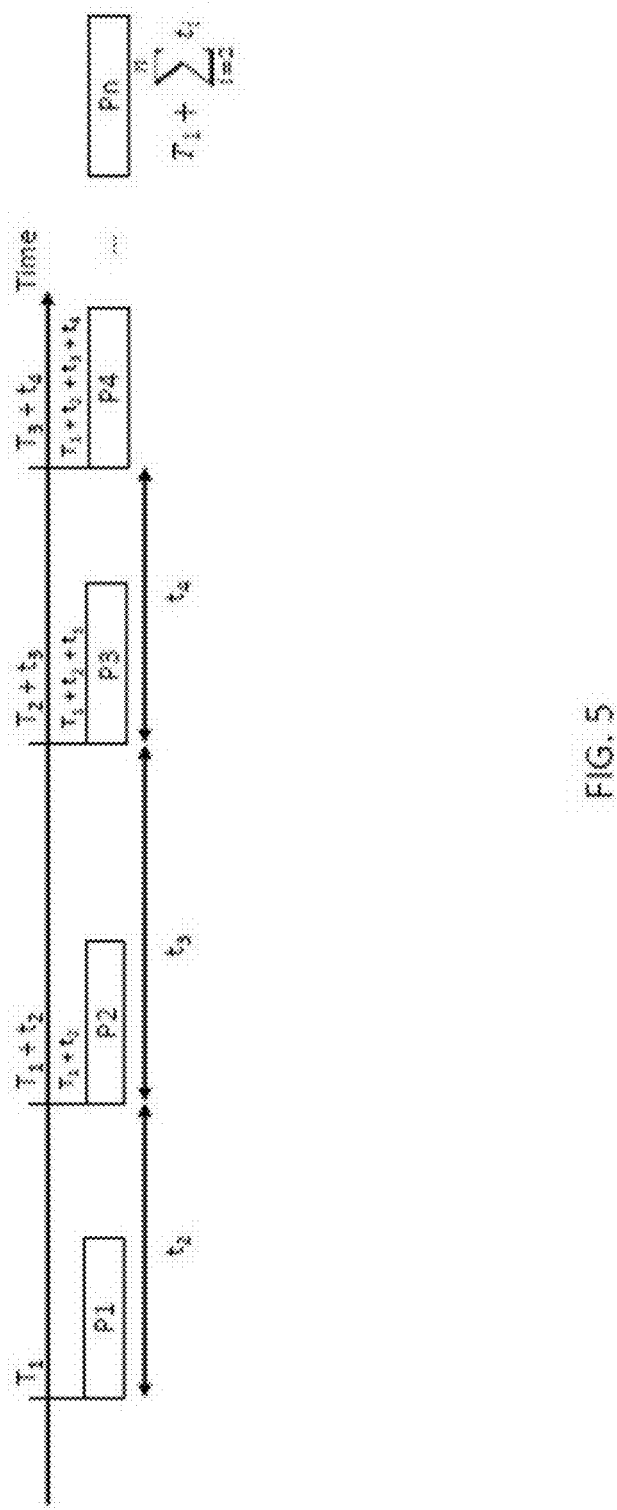
FIG. 5 represents the sequence of client packets for a particular incoming client flow arriving at the ingress node.

FIG. 5 represents the sequence of client packets for a particular incoming client flow 110 arriving at the ingress node 120. A first packet P1 arrives at the ingress node 120 at time $T_1$, a second packet P2 arrives at time $(T_1+t_2)$, where the inter-packet gap between packets P1 and P2 is $t_2$. Similarly, a third packet P3 arrives at time $(T_1+t_2+t_3)$, where the inter-packet gap between packets P2 and P3 is $t_3$, and so on, where the inter-packet gap for each client packet after the first packet P1 is pre-pended to the client packet in the node payload 324 of the TDM packet 300 of FIG. 3.

Between an input port of the ingress node 120 and the corresponding output port of the egress node 140, a client packet will be subjected to two kinds of jitter:

Jitter added by networking elements on the path 132 though the switch fabric 130. Although the path 132 is fixed, preemption can add (e.g., 200 ns) jitter per switch, and other electronic components (e.g., a specialized intermediate node) can also add a bit of jitter; and Jitter added by the TDM process itself. Since the incoming client flow 110 is not synchronized with the scheduling algorithm (implemented by the scheduler 240 of FIG. 2), the client packet might be subjected to an unknown waiting period before insertion in the TDM bus. The jitter added is equal to the periodicity of the reservation of a slot.

The goal of the jitter compensation mechanism for the network 100 is for all of the packets in the same client flow to experience the same latency as they traverse from the corresponding input port of the ingress node 120 to the corresponding output port of the egress node 140, so that there is no apparent jitter. The egress node 140 uses the inter-packet gap values in the pre-pended client packets (326 of FIG. 3) to recreate the same inter-packet gaps between pairs of consecutive packets that existed at the ingress node 120.

This mechanism could reduce jitter to clock cycle precision if the clocks (e.g., 204 in FIG. 2 and 430 in FIG. 4) at the ingress and egress nodes 120 and 140 either run at the exact same frequency or are explicitly synchronized. Due to differences in quartz crystals, power, and/or temperature, the clocks do not run at the exact same frequency and explicit synchronization would greatly increase implementation cost.

Since the clock 430 in the egress node 400 will typically operate at a rate that differs from the rate of the clock 204 in the ingress node 200, the purpose of the frequency difference estimator 440 is to characterize that clock-rate difference 442 to enable the jitter controllers 470 to compensate for that clock-rate difference when generating the outgoing client flows 150 to ensure deterministic communications between the ingress node 120 and the egress node 140 of FIG. 1. In some implementations, the frequency difference estimator 440 generates an average time difference over each period of time of a specified duration and then determines the drift in those average time differences over a longer period of time (i.e., the evolution of those average time differences) to characterize the clock-rate difference 442. For example, in one possible implementation, an average time difference is generated over each 5-millisecond time period, and the clock-rate difference 442 is continually determined and updated as needed. The resulting clock-rate difference 442 is provided to the eight jitter controllers 470 for use in adjusting the timing of the outgoing client streams 150 as described further below. In some implementations, a single clock-rate difference 442 is generated for all of the different client flows. In other implementations, for example, those implementations with one or more intermediate nodes along the path 132, an individual clock-rate difference 442 is independently generated for each different client flow.

In addition, the corresponding jitter controller 470 subtracts the pre-pended client packet timestamp from TDM packet timestamp from the node header to determine the time spent by the client packet in the ingress node 120 to compensate for jitter added by the TDM process.

Figure 6:
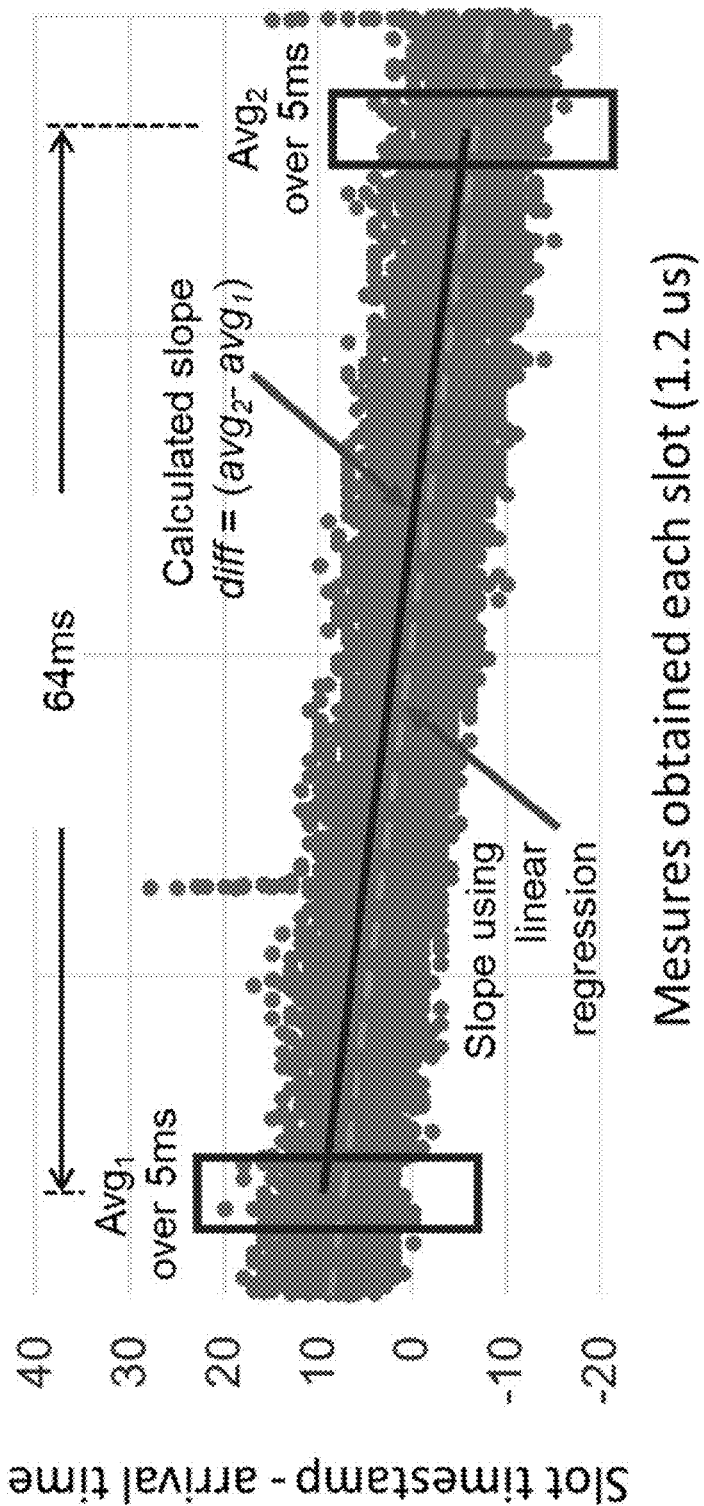
FIG. 6 shows a timeline representing an example of the evolution in the average time differences generated by the frequency difference estimator of FIG. 4.

FIG. 6 shows a timeline representing an example of the evolution in the average time differences generated by the frequency difference estimator 440 of FIG. 4. As shown in the example of FIG. 6, for average time differences calculated over 5-millisecond intervals, the average time difference has drifted by 96 nanoseconds over 64 milliseconds, where the Y axis is in 6.4-nanosecond increments, which drift corresponds to a 1.5-microsecond drift per second. This drift results from the accumulation of the inter-packet gaps being counted at the ingress node 120 at the frequency of its local clock (e.g., clock 204 of FIG. 2) and the inter-packet gaps being de-counted at the egress node 120 at the different frequency of its local clock (e.g., clock 430 of FIG. 4).

The frequency difference estimator 440 generates the clock-rate difference 442 based on an estimate of the drift by computing the slope of the evolution of the average time differences as represented in FIG. 6. Depending on the implementation, the slope can be computed either through linear regression or by comparing two average time differences separated in time. The jitter controllers 470 use the clock-rate difference 442 from the frequency difference estimator 440 to increment or decrement the inter-packet gap counter between the consecutive client packets in the corresponding outgoing client flows 150 as needed to compensate for the different clock frequencies, thereby ensuring little if any jitter.

As shown in FIG. 4, the packet extractor 420 also extracts from the TDM packet the identification 422 of the client flow 110 corresponding to the current time slot and applies that identification 422 to demultiplexer 450, which forwards the extracted client packet 424 to the appropriate FIFO buffer 460. The corresponding jitter controller 470 then adjusts the timing of the client packet 424 as needed based on the clock-rate difference 442 from the frequency difference estimator 440. The corresponding resulting outgoing client packet is then presented at the corresponding node 480 for inclusion in the corresponding outgoing client flow 150. Note that, because the egress node 400 determines the client flow corresponding to each TDM packet using information contained in the TDM packets, the egress node 400 does not have to be explicitly programmed by the node controller 160 with the selected sequencing schedule employed by the ingress node 200.

When (i) the ingress and egress nodes 120 and 140 of FIG. 1 are respectively implemented using the ingress and egress nodes 200 and 400 of FIGS. 2 and 4 and (ii) the switch fabric 130 of FIG. 1 is configured to provide a fixed path 132 for the TDM flow 122, the communication network 100 of FIG. 1 is able to provide deterministic communication from the input ports of the ingress node 120 to the corresponding output ports of the egress node 140.

As mentioned above, in some implementations, when the number of existing incoming client flows 110 at the ingress node 120 is less than the maximum number of client flows that the ingress node 120 is capable of handling, one or more intermediate nodes provisioned along the path 132 from the ingress node 120 to the egress node 140 may be employed to add client flows up to the number of missing client flows, with each intermediate node adding one or more client flows to the TDM flow 122.

Figure 7:
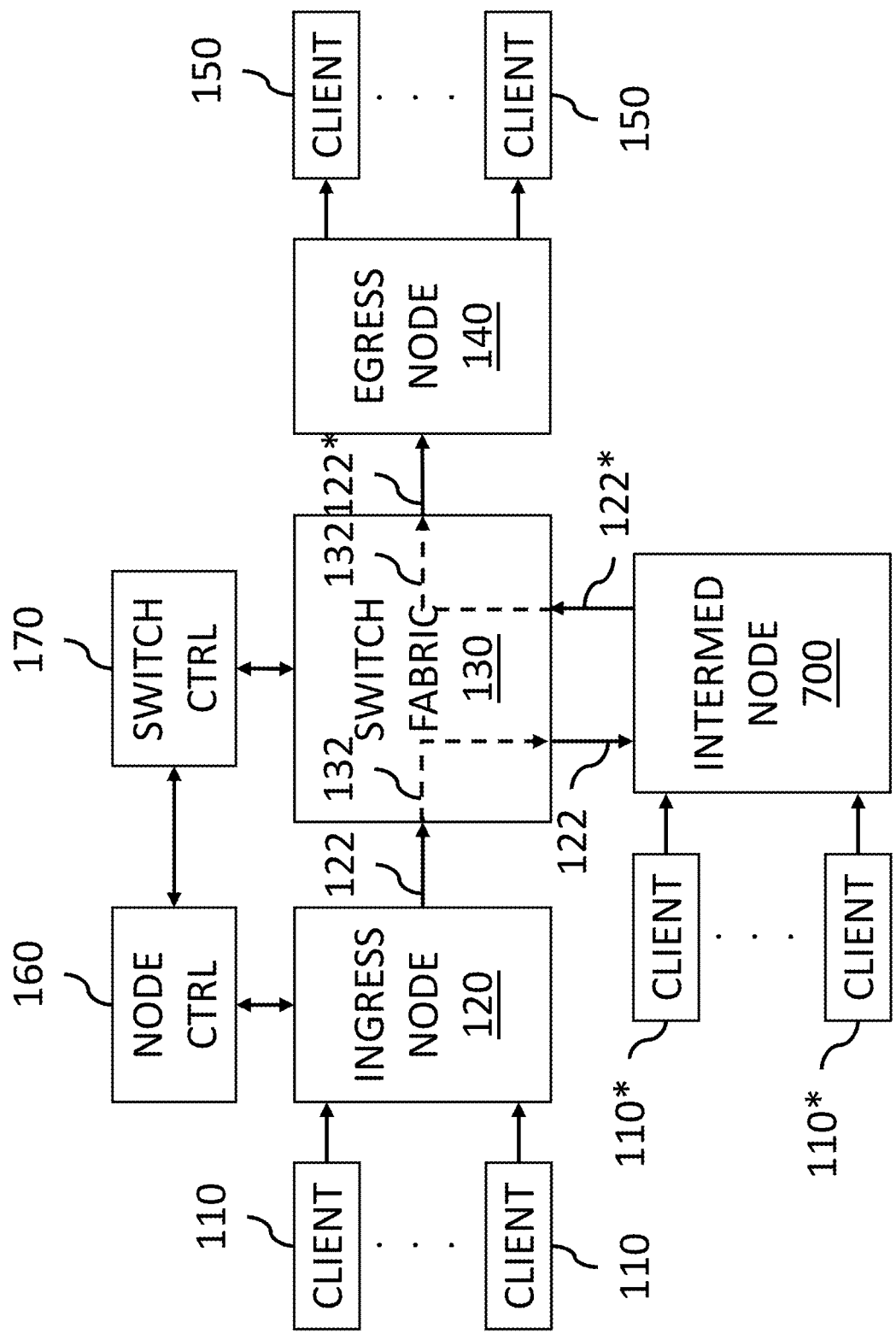
FIG. 7 is a block diagram of the communication network of FIG. 1 having a single intermediate node provisioned along the path through the mesh network from the ingress node to the egress node.

FIG. 7 is a block diagram of the communication network 100 of FIG. 1 having a single intermediate node 700 provisioned along the path 132 through the mesh network 130 from the ingress node 120 to the egress node 140 for the TDM flow 122. As in FIG. 1, ingress node 120 is capable of TDMizing a plurality of incoming client flows 110 to form a single TDM flow 122 that is routed along the path 132 through the switch fabric 130 to the egress node 140. In this situation, however, only a subset of the possible incoming client flows 110 are present at the ingress node 120, which is configured to generate empty TDM packets for the time slots associated with the "missing" incoming client flows 110.

In this case, the intermediate node 700 is able to replace the empty TDM packets in the TDM flow 122 corresponding to one or more of the missing incoming client flows 110 with TDM packets corresponding to a corresponding number of additional incoming client flows 110* that are present at the intermediate node 700 to generate an augmented TDM flow 122* that includes TDM packets corresponding to the incoming client flows 110 that are present at the ingress node 120 as well as TDM packets corresponding to the incoming client flows 110* that are present at the intermediate node 700.

The egress node 140 is capable of recovering outgoing client flows 150 corresponding to both sets of incoming client flows 110 and 110* from the augmented TDM flow 122*.

Although not explicitly shown in FIG. 7, the intermediate node 700 is also controlled by the node controller 160 of FIG. 1.

Figure 8:
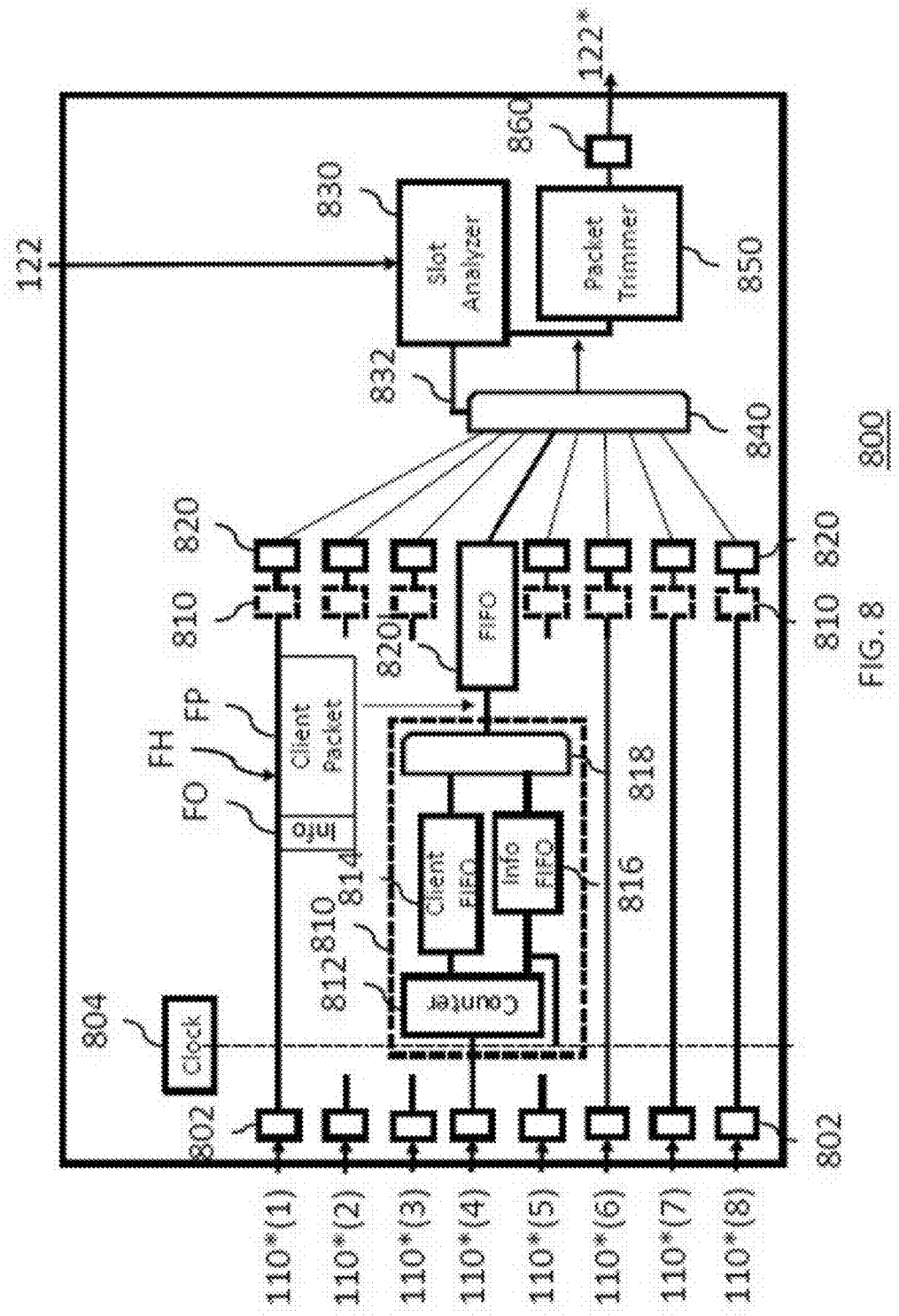
FIG. 8 is a block diagram of an intermediate node according to one possible implementation of the intermediate node of FIG. 7.

FIG. 8 is a block diagram of a specialized intermediate node 800 according to one possible implementation of the intermediate node 700 of FIG. 7. In this particular implementation, the intermediate node 700 is capable of TDMizing up to eight different incoming client flows 110* for inclusion in the augmented TDM flow 122*. Note that, as controlled by the node controller 160 of FIG. 1, the intermediate node 700 will be configured to handle incoming client flows 110* corresponding to only one or more or all of the missing incoming client flows 110 at the ingress node 120.

The elements of the intermediate node 800 of FIG. 8 that have analogous labels as elements in the ingress node 200 of FIG. 2 perform analogous functions. In this way, the intermediate node 800 is capable of TDMizing up to eight different incoming client flows 110* to store corresponding node packets in the corresponding node packet buffers 820. Note that the timestamps for the node packets associated with the incoming client flows 110* are generated by the local clock 804 at the intermediate node 800.

The main difference between the intermediate node 800 of FIG. 8 and the ingress node 200 of FIG. 2 is that, instead of the scheduler 240 and the empty packet generator 260 of FIG. 2, the intermediate node 800 has slot analyzer 830. The slot analyzer 830 receives the TDM flow 122 that was generated by the ingress node 120 of FIG. 1, identifies (based on programming by the node controller 160 of FIG. 1) whether the current time slot corresponds to one of the missing incoming client flows 110 at the ingress node 120, and, if so, provides the corresponding current slot index 832 to the multiplexer 840. If the node packet buffer 820 corresponding to the current slot index 832 has a node packet available, then the multiplexer 840 inserts that node packet into the corresponding empty TDM packet from the TDM flow 122. The resulting, different TDM packet is trimmed by packet trimmer 850 and forwarded to output port 860. Note that, if the node packet buffer 820 does not have a packet available or if the current time slot does not corresponding to a missing incoming client flow 110 at the ingress node 120, then the contents of the current time slot are forwarded unchanged to the output port 860. The resulting augmented TDM flow 122* presented at output port 860 is then transmitted along the path 132 to the egress node 140 of FIG. 1 for processing analogous to that described previously for the TDM flow 122 at the egress node 400 of FIG. 4.

Here, too, when (i) the ingress, intermediate, and egress nodes 120, 700, and 140 of FIG. 7 are respectively implemented using the ingress, intermediate, and egress nodes 200, 800, and 400 of FIGS. 2, 8, and 4 and (ii) the switch fabric 130 of FIG. 1 is configured to provide a fixed path 132 for the TDM flows 122 and 122*, the communication network 100 of FIG. 1 is able to provide deterministic communication from the input ports of both the ingress node 120 and the intermediate node 700 to the corresponding output ports of the egress node 140.

Figure 9:
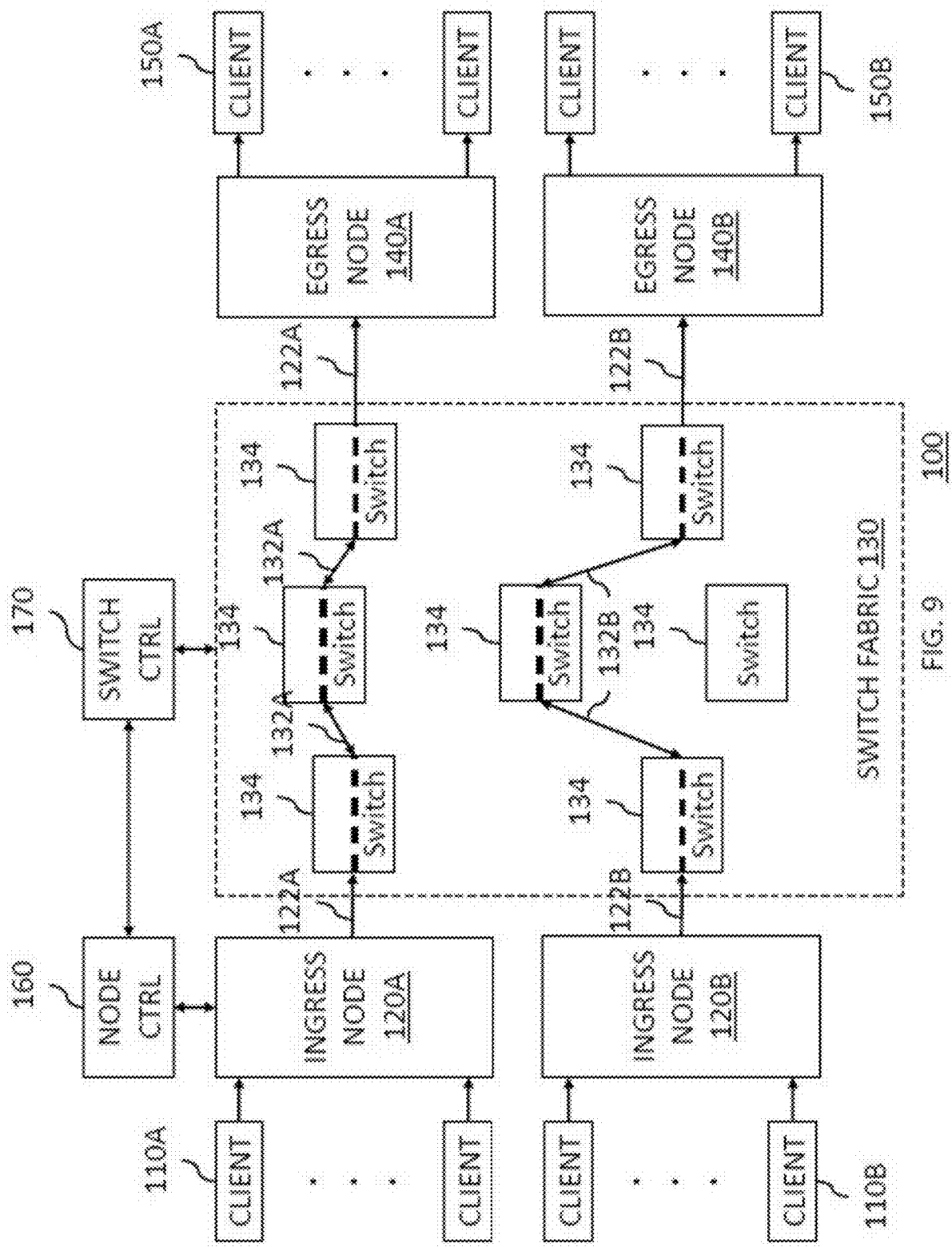
FIG. 9 is a block diagram of an embodiment of the communication network of FIG. 1 showing two ingress nodes and two egress nodes and two different fixed paths through the switch fabric.

FIG. 9 is a block diagram of an embodiment of the communication network 100 of FIG. 1 showing two ingress nodes 120A and 120B, two egress nodes 140A and 140B, and two different fixed paths 132A and 132B through the switch fabric 130. As shown in FIG. 9, ingress node 120A generates TDM flow 122A from incoming client flows 110A, and egress node 140A recovers outgoing client flows 150A from that TDM flow 122A. Similarly, ingress node 120B generates TDM flow 122B from incoming client flows 110B, and egress node 140B recovers outgoing client flows 150B from that TDM flow 122B.

In the embodiment of FIG. 9, switch fabric 130 comprises a mesh network of switches 134, where the dashed lines through certain switches represent the bridges configured through those switches as part of the fixed paths 132A and 132B. Those skilled in the art will understand that, depending on the particular implementation, the switches 134 can perform any form of layer 1 to 3 switching.

In some implementations, the switch controller 170 will create a bridge through every packet switch 134 along the fixed path 132A/B, where the term "bridge" refers to any suitable mechanism that connects an input port of a switch exclusively to an output port of that switch. A bridge functions as a shortcut through the internal switching matrix of a switch 134. In some implementations, a bridge is created using the virtual local area network (VLAN) feature of an individual switch 134, ensuring that the TDMized flow 122A/B will flow without contention, with a guarantee of delivery and minimal latency variation.

In some implementations, a bridge is configured without accessing the configuration of the switch 134 using a specialized protocol involving an ingress node 120, the node controller 160, the switch controller 170, and the switch 134 as follows:

The ingress node 120 receives time-sensitive packets from one or more incoming client flows 110 that identify the corresponding outgoing client flows 150;

The ingress node 120 sends, to the node controller 160, a request for a fixed path from a specified outgoing port of the ingress node 120 to the outgoing client flows 150;

The node controller 160 determines the input port of the egress node 140 corresponding to the outgoing client flows 150 and sends, to the switch controller 170, a request for a fixed path from the specified output port of the ingress node 120 through the switch fabric 130 to the specified input port of the egress node 140;

The switch controller 170 determines (i) the switches 134 of the switch fabric 130 for the requested fixed path as well as (ii) the input and output ports of those switches for bridges for that fixed path and then configures those switches to provide those bridges.

When the ingress node 120 determines that the time-sensitive client traffic has been terminated, the ingress node 120 notifies the node controller 160, which, in turn, notifies the switch controller 170, which, in turn, instructs the corresponding switches 134 to release their bridges.

In some implementations, the ingress node 120, the egress node 140, and the intermediate node 700, if any, are implemented using different instances of the same programmable component, where each component is appropriately programmed (e.g., by the node controller 160) to function as either an ingress node, an egress node, or an intermediate node.

The disclosure has been described in the context of implementations in which an inter-packet gap value is explicitly pre-pended to each client packet in a TDM packet. In alternative implementations, instead of explicitly transmitting such inter-packet gap values in the TDM packets, the inter-packet gap values are calculated at the egress node 140 from the pre-pended timestamps for consecutive client packets corresponding to the same incoming client flow 110. Note that, in these latter implementations, the egress node 140 will save the timestamp for the last client packet in a TDM packet for use in generating the inter-packet gap value for the first client packet in the next TDM packet for the same incoming client flow 110.

In certain embodiments, the present disclosure is a communication network comprising a plurality of specialized nodes and a switch fabric having plurality of data packet switching nodes, each of the specialized nodes being locally connected to the switch fabric at a corresponding port of one of the data packet switching nodes. One of the specialized nodes is capable of operating as an ingress node to convert one or more incoming data flows into a packetized, time-division multiplexed (TDM) data flow; the switch fabric is configurable to route the packetized, TDM data flow via a same selected path through the switch fabric in a contention-free manner to another of the specialized nodes; and the another of the specialized nodes is capable of operating as an egress node of the packetized, TDM data flow received from the switch fabric to convert the received packetized, TDM data flow into one or more outgoing data flows.

In at least some of the above embodiments, the network is capable of setting up the selected path by forming a bridge between two ports of each data packet switching node along the selected path, the two ports being along the selected path.

In at least some of the above embodiments, the network is capable of setting up each bridge by forming a virtual local area network between the two ports of the corresponding data packet switching node along the selected path.

In at least some of the above embodiments, a third of the specialized nodes is capable of operating as an ingress node to convert one or more incoming data flows into a second packetized, TDM data flow; the switch fabric is configurable to route the second packetized, TDM data flow via a same second selected path through the switch fabric in a contention-free manner to a fourth of the specialized nodes; and the fourth of the specialized nodes is capable of operating as an egress node of the second packetized, TDM data flow received from the packet switch fabric to convert the received second packetized, TDM data flow into one or more outgoing data flows.

In certain embodiments, the present disclosure is a communication network comprising a specialized ingress node configured to convert one or more incoming flows into a single, packetized, time-division multiplexed (TDM) flow; a switch fabric configured to route the TDM flow via a fixed path through the switch fabric in a contention-free manner; and a specialized egress node configured to convert the TDM flow received from the switch fabric into one or more outgoing flows corresponding to the one or more incoming flows.

In at least some of the above embodiments, the ingress node comprises an ingress clock configured to generate an ingress timestamp for each TDM packet transmitted by the ingress node in the TDM flow; the egress node comprises an egress clock configured to generate an egress time for each TDM packet received by the egress node in the TDM flow; for each TDM packet, the egress node is configured to generate a time difference between the ingress timestamp and the egress time for the TDM packet; for each subset of TDM packets, the egress node is configured to generate an average time difference between the ingress timestamps and the corresponding egress times; and the egress node is configured (i) to track evolution of the average time differences to characterize a timing difference between the ingress clock and the egress clock and (ii) use the characterized timing difference in generating the one or more outgoing flows.

In at least some of the above embodiments, the ingress node is configured to generate TDM packets for the TDM flow, where each TDM packet has a length that is less than or equal to the duration of a TDM time slot in the TDM flow; and if the length of a TDM packet is less than the duration of the corresponding TDM time slot, then the switch fabric is configured to use the remainder of the TDM time slot after the TDM packet for available non-deterministic traffic.

In at least some of the above embodiments, the network further comprises a specialized intermediate node along the path through the switch fabric, wherein the ingress node is configured to fill a first subset of time slots of the TDM flow with TDM packets corresponding to a first subset of one or more incoming flows; the intermediate node is configured to convert a second subset of one or more incoming flows into TDM packets for inclusion in a second subset of available time slots of the TDM flow; and the egress node is configured to generate outgoing flows from the TDM packets for the first and second subsets of incoming flows.

In at least some of the above embodiments, the network further comprises a controller configured to configure the switch fabric to provide the fixed path.

In at least some of the above embodiments, the controller is configured to configure the ingress node with a selected scheduling algorithm for TDMizing the incoming flows.

In at least some of the above embodiments, the egress node is configured to convert the received TDM flow to the outgoing flows based only on information contained in the TDM packets without needing to be configured with the selected scheduling algorithm by the controller.

In at least some of the above embodiments, the controller is configured to communicate with a switch controller for the switch fabric to (i) identify a switch fabric output port associated with the egress node and (ii) request that the switch controller establish the fixed path through the switch fabric.

In at least some of the above embodiments, the ingress node is configured to support a plurality of different scheduling algorithms, each scheduling algorithm corresponding to an order of individually servicing one or more incoming flows; and, for each serviced incoming flow in a selected scheduling algorithm, the ingress node generates a TDM packet from the serviced incoming flow for a corresponding TDM time slot in the TDM flow.

In at least some of the above embodiments, each TDM packet corresponding to a serviced incoming flow comprises a switch-fabric header corresponding to the switch fabric protocol; a node header comprising a timestamp corresponding to a time that the TDM packet is generated and slot information identifying the serviced incoming flow; and one or more client packets corresponding to the serviced incoming flow. Each client packet is pre-pended by a packet-length field indicate length of the client packet and a timestamp corresponding to a time that the client packet was received at its ingress node.

In at least some of the above embodiments, each client packet is further pre-pended by an inter-packet gap field indicating a time delay from the previous client packet in the incoming flow.

In certain embodiments, the present disclosure is a specialized node for a communication network comprising an ingress node, a switch fabric, and an egress node, wherein the ingress node is configured to convert one or more incoming flows into a single, packetized, TDM flow; the switch fabric is configured to route the TDM flow via a fixed path through the switch fabric in a contention-free manner; and the egress node is configured to convert the TDM flow received from the switch fabric into one or more outgoing flows corresponding to the one or more incoming flows, wherein the specialized node is configurable to be either the ingress node or the egress node, wherein the specialized node is one of the ingress node and the egress node.

In at least some of the above embodiments, the specialized node is configurable to be either one of the ingress node or the egress node.

In at least some of the above embodiments, the specialized node is configurable to be a specialized intermediate node along the path through the switch fabric, wherein the ingress node is configured to fill a first subset of time slots of the TDM flow with TDM packets corresponding to a first subset of one or more incoming flows; the intermediate node is configured to convert a second subset of one or more incoming flows into TDM packets for inclusion in a second subset of available time slots of the TDM flow; and the egress node is configured to generate outgoing flows from the TDM packets for the first and second subsets of incoming flows.

In at least some of the above embodiments, the ingress node comprises an ingress clock configured to generate an ingress timestamp for each TDM packet transmitted by the ingress node in the TDM flow; the egress node comprises an egress clock configured to generate an egress time for each TDM packet received by the node in the TDM flow; for each TDM packet, the egress node is configured to generate a time difference between the ingress timestamp and the egress time for the TDM packet; for each subset of TDM packets, the egress node is configured to generate an average time difference between the ingress timestamps and the corresponding egress times; and the egress node is configured (i) to track evolution of the average time differences to characterize a timing difference between the ingress clock and the egress clock and (ii) use the characterized timing difference in generating the one or more outgoing flows.

In at least some of the above embodiments, the ingress node is configured to generate TDM packets for the TDM flow, where each TDM packet has a length that is less than or equal to the duration of a TDM time slot in the TDM flow; and, if the length of a TDM packet is less than the duration of the corresponding TDM time slot, then the switch fabric is configured to use the remainder of the TDM time slot after the TDM packet for available non-deterministic traffic.

In at least some of the above embodiments, the network further comprises a controller configured to configure the switch fabric to provide the fixed path, wherein the controller is configured to configure the ingress node with a selected scheduling algorithm for TDMizing the incoming flows; the egress node is configured to convert the received TDM flow to the outgoing flows based only on information contained in the TDM packets without needing to be configured with the selected scheduling algorithm by the controller; and the controller is configured to communicate with a switch controller for the switch fabric to (i) identify a switch fabric output port associated with the egress node and (ii) request that the switch controller establish the fixed path through the switch fabric.

In at least some of the above embodiments, the ingress node is configured to support a plurality of different scheduling algorithms, each scheduling algorithm corresponding to an order of individually servicing one or more incoming flows; and, for each serviced incoming flow in a selected scheduling algorithm, the ingress node generates a TDM packet from the serviced incoming flow for a corresponding TDM time slot in the TDM flow.

In at least some of the above embodiments, each TDM packet corresponding to a serviced incoming flow comprises a switch-fabric header corresponding to the switch fabric protocol; a node header comprising a timestamp corresponding to a time that the TDM packet is generated and slot information identifying the serviced incoming flow; and one or more client packets corresponding to the serviced incoming flow. Each client packet is pre-pended by a packet-length field indicate length of the client packet and a timestamp corresponding to a time that the client packet was received at its ingress node.

In certain embodiments, the present disclosure is a method comprising converting one or more incoming flows into a single, packetized, TDM flow; routing the TDM flow via a fixed path through a switch fabric in a contention-free manner; and converting the TDM flow received from the switch fabric into one or more outgoing flows corresponding to the one or more incoming flows.

Embodiments of the disclosure may be implemented as (analog, digital, or a hybrid of both analog and digital) circuit-based processes, including possible implementation as a single integrated circuit (such as an ASIC or an FPGA), a multi-chip module, a single card, or a multi-card circuit pack. As would be apparent to one skilled in the art, various functions of circuit elements may also be implemented as processing blocks in a software program. Such software may be employed in, for example, a digital signal processor, micro-controller, general-purpose computer, or other processor.

Also for purposes of this disclosure, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

Signals and corresponding terminals, nodes, ports, links, interfaces, or paths may be referred to by the same name and are interchangeable for purposes here.

As used herein in reference to an element and a standard, the terms "compatible" and "conform" mean that the element communicates with other elements in a manner wholly or partially specified by the standard, and would be recognized by other elements as sufficiently capable of communicating with the other elements in the manner specified by the standard. A compatible or conforming element does not need to operate internally in a manner specified by the standard.

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present disclosure may take the form of an entirely software-based embodiment (including firmware, resident software, micro-code, and the like), an entirely hardware embodiment, or an embodiment combining software and hardware aspects that may generally be referred to herein as a "system."

Embodiments of the disclosure can be manifest in the form of methods and apparatuses for practicing those methods. Embodiments of the disclosure can also be manifest in the form of program code embodied in tangible media, such as magnetic recording media, optical recording media, solid state memory, floppy diskettes, CD-ROMs, hard drives, or any other non-transitory machine-readable storage medium, wherein, when the program code is loaded into and executed by a machine, such as a computer, the machine becomes an apparatus for practicing the disclosure. Embodiments of the disclosure can also be manifest in the form of program code, for example, stored in a non-transitory machine-readable storage medium including being loaded into and/or executed by a machine, wherein, when the program code is loaded into and executed by a machine, such as a computer, the machine becomes an apparatus for practicing the disclosure. When implemented on a general-purpose processor, the program code segments combine with the processor to provide a unique device that operates analogously to specific logic circuits.

Any suitable processor-usable/readable or computer-usable/readable storage medium may be utilized. The storage medium may be (without limitation) an electronic, magnetic, optical, electromagnetic, infrared, or semiconductor system, apparatus, or device. A more-specific, non-exhaustive list of possible storage media include a magnetic tape, a portable computer diskette, a hard disk, a random access memory (RAM), a read-only memory (ROM), an erasable programmable read-only memory (EPROM) or Flash memory, a portable compact disc read-only memory (CD-ROM), an optical storage device, and a magnetic storage device. Note that the storage medium could even be paper or another suitable medium upon which the program is printed, since the program can be electronically captured via, for instance, optical scanning of the printing, then compiled, interpreted, or otherwise processed in a suitable manner including but not limited to optical character recognition, if necessary, and then stored in a processor or computer memory. In the context of this disclosure, a suitable storage medium may be any medium that can contain or store a program for use by or in connection with an instruction execution system, apparatus, or device.

It should be appreciated by those of ordinary skill in the art that any block diagrams herein represent conceptual views of illustrative circuitry embodying the principles of the disclosure.

Unless explicitly stated otherwise, each numerical value and range should be interpreted as being approximate as if the word "about" or "approximately" preceded the value or range.

It will be further understood that various changes in the details, materials, and arrangements of the parts which have been described and illustrated in order to explain embodiments of this disclosure may be made by those skilled in the art without departing from embodiments of the disclosure encompassed by the following claims.

In this specification including any claims, the term "each" may be used to refer to one or more specified characteristics of a plurality of previously recited elements or steps. When used with the open-ended term "comprising," the recitation of the term "each" does not exclude additional, unrecited elements or steps. Thus, it will be understood that an apparatus may have additional, unrecited elements and a method may have additional, unrecited steps, where the additional, unrecited elements or steps do not have the one or more specified characteristics.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the disclosure.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

All documents mentioned herein are hereby incorporated by reference in their entirety or alternatively to provide the disclosure for which they were specifically relied upon.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they fall within the scope of the claims.

As used herein and in the claims, the term "provide" with respect to an apparatus or with respect to a system, device, or component encompasses designing or fabricating the apparatus, system, device, or component; causing the apparatus, system, device, or component to be designed or fabricated; and/or obtaining the apparatus, system, device, or component by purchase, lease, rental, or other contractual arrangement.

Unless otherwise specified herein, the use of the ordinal adjectives "first," "second," "third," etc., to refer to an object of a plurality of like objects merely indicates that different instances of such like objects are being referred to, and is not intended to imply that the like objects so referred-to have to be in a corresponding order or sequence, either temporally, spatially, in ranking, or in any other manner.

While preferred embodiments of the disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the technology of the disclosure. It is intended that the following claims define the scope of the invention and that methods and structures within the scope of these claims and their equivalents be covered thereby.

What is claimed is:

1. A communication network comprising:
   a plurality of specialized nodes; and
   a switch fabric comprising a plurality of data packet switching nodes, each of the specialized nodes being locally connected to the switch fabric at a corresponding port of one of the data packet switching nodes, wherein:
   one of the specialized nodes is capable of operating as an ingress node to convert one or more incoming data flows into a packetized, time-division multiplexed (TDM) data flow;
   the switch fabric is configurable to route the packetized, TDM data flow via a same selected path through the switch fabric in a contention-free manner to another of the specialized nodes; and
   the another of the specialized nodes is capable of operating as an egress node of the packetized, TDM data flow received from the switch fabric by performing jitter compensation to convert the received packetized, TDM data flow into one or more outgoing data flows, wherein the communication network is configured to route at least one selected incoming data flow of the one or more incoming data flows through the switch fabric with a jitter level that is guaranteed to be maintained within a specified jitter range.

2. The communication network of claim 1, wherein the network is capable of setting up the selected path by forming a bridge between two ports of each data packet switching node along the selected path, the two ports being along the selected path.

3. The communication network of claim 2, wherein the network is capable of setting up each bridge by forming a virtual local area network between the two ports of the corresponding data packet switching node along the selected path.

4. The communication network of claim 1, wherein:
   a third of the specialized nodes is capable of operating as an ingress node to convert one or more incoming data flows into a second packetized, TDM data flow;
   the switch fabric is configurable to route the second packetized, TDM data flow via a same second selected path through the switch fabric in a contention-free manner to a fourth of the specialized nodes; and
   the fourth of the specialized nodes is capable of operating as an egress node of the second packetized, TDM data flow received from the packet switch fabric to convert the received second packetized, TDM data flow into one or more outgoing data flows.

5. The network of claim 1, wherein:
   the ingress node comprises an ingress clock configured to generate an ingress timestamp for each TDM packet transmitted by the ingress node in the TDM flow;
   the egress node comprises an egress clock configured to generate an egress time for each TDM packet received by the egress node in the TDM flow;
   for each TDM packet, the egress node is configured to generate a time difference between the ingress timestamp and the egress time for the TDM packet;
   for each subset of TDM packets, the egress node is configured to generate an average time difference between the ingress timestamps and the corresponding egress times; and
   the egress node is configured (i) to track evolution of the average time differences to characterize a timing difference between the ingress clock and the egress clock and (ii) use the characterized timing difference in generating the one or more outgoing flows.

6. The network of claim 1, wherein:
   the ingress node is configured to generate TDM packets for the TDM flow, where each TDM packet has a length that is less than or equal to the duration of a TDM time slot in the TDM flow; and
   if the length of a TDM packet is less than the duration of the corresponding TDM time slot, then the switch fabric is configured to use the remainder of the TDM time slot after the TDM packet for available non-deterministic traffic.

7. The network of claim 1, further comprising a specialized intermediate node along the path through the switch fabric, wherein:
   the ingress node is configured to fill a first subset of time slots of the TDM flow with TDM packets corresponding to a first subset of one or more incoming flows;
   the intermediate node is configured to convert a second subset of one or more incoming flows into TDM packets for inclusion in a second subset of available time slots of the TDM flow; and
   the egress node is configured to generate outgoing flows from the TDM packets for the first and second subsets of incoming flows.

8. The network of claim 1, further comprising a controller configured to configure the switch fabric to provide the fixed path, wherein the controller is configured to configure the ingress node with a selected scheduling algorithm for converting the incoming flows into at least one TDM flow.

9. The network of claim 8, wherein the egress node is configured to convert the received TDM flow to the outgoing flows based only on information contained in the TDM packets without needing to be configured with the selected scheduling algorithm by the controller.

10. The network of claim 8, wherein the controller is configured to communicate with a switch controller for the switch fabric to (i) identify a switch fabric output port associated with the egress node and (ii) request that the switch controller establish the fixed path through the switch fabric.

11. The network of claim 1, wherein:
the ingress node is configured to support a plurality of different scheduling algorithms, each scheduling algorithm corresponding to an order of individually servicing one or more incoming flows; and
for each serviced incoming flow in a selected scheduling algorithm, the ingress node generates a TDM packet from the serviced incoming flow for a corresponding TDM time slot in the TDM flow.

12. The network of claim 11, wherein:
each TDM packet corresponding to a serviced incoming flow comprises:
  a switch-fabric header corresponding to the switch fabric protocol;
  a node header comprising a timestamp corresponding to a time that the TDM packet is generated and slot information identifying the serviced incoming flow; and
  one or more client packets corresponding to the serviced incoming flow; and
each client packet is pre-pended by:
  a packet-length field indicate length of the client packet; and
  a timestamp corresponding to a time that the client packet was received at its ingress node.

13. The network of claim 12, wherein each client packet is further pre-pended by an inter-packet gap field indicating a time delay from the previous client packet in the incoming flow.

14. A specialized node for a communication network comprising an ingress node, a switch fabric comprising a plurality of data packet switching nodes, and an egress node, wherein:
the ingress node is configured to convert one or more incoming flows into a single, packetized, time-division multiplexed (TDM) flow;
the switch fabric is configured to route the TDM flow via a fixed path through the switch fabric in a contention-free manner; and
the egress node is configured to perform jitter compensation to convert the TDM flow received from the switch fabric into one or more outgoing flows corresponding to the one or more incoming flows, wherein the specialized node comprises a memory connected to a processor that enables the specialized node to be configurable to be either the ingress node or the egress node, wherein the specialized node is one of the ingress node and the egress node, wherein the specialized node is configured to enable the communication network to route at least one selected incoming data flow of the one or more incoming data flows through the switch fabric with a jitter level that is guaranteed to be maintained within a specified jitter range.

15. The specialized node of claim 14, wherein the specialized node is configurable to be either one of the ingress node, the egress node, or an intermediate node along the path through the switch fabric, wherein:
the ingress node is configured to fill a first subset of time slots of the TDM flow with TDM packets corresponding to a first subset of one or more incoming flows;
the intermediate node is configured to convert a second subset of one or more incoming flows into TDM packets for inclusion in a second subset of available time slots of the TDM flow; and
the egress node is configured to generate outgoing flows from the TDM packets for the first and second subsets of incoming flows.

16. The specialized node of claim 14, wherein:
the ingress node comprises an ingress clock configured to generate an ingress timestamp for each TDM packet transmitted by the ingress node in the TDM flow;
the egress node comprises an egress clock configured to generate an egress time for each TDM packet received by the specialized node in the TDM flow;
for each TDM packet, the egress node is configured to generate a time difference between the ingress timestamp and the egress time for the TDM packet;
for each subset of TDM packets, the egress node is configured to generate an average time difference between the ingress timestamps and the corresponding egress times; and
the egress node is configured (i) to track evolution of the average time differences to characterize a timing difference between the ingress clock and the egress clock and (ii) use the characterized timing difference in generating the one or more outgoing flows.

17. The specialized node of claim 14, wherein:
the ingress node is configured to generate TDM packets for the TDM flow, where each TDM packet has a length that is less than or equal to the duration of a TDM time slot in the TDM flow; and
if the length of a TDM packet is less than the duration of the corresponding TDM time slot, then the switch fabric is configured to use the remainder of the TDM time slot after the TDM packet for available non-deterministic traffic.

18. The specialized node of claim 14, wherein the network further comprises a controller configured to configure the switch fabric to provide the fixed path, wherein:
the controller is configured to configure the ingress node with a selected scheduling algorithm for converting the incoming flows into at least one TDM flow;
the egress node is configured to convert the received TDM flow to the outgoing flows based only on information contained in the TDM packets without needing to be configured with the selected scheduling algorithm by the controller; and
the controller is configured to communicate with a switch controller for the switch fabric to (i) identify a switch fabric output port associated with the egress node and (ii) request that the switch controller establish the fixed path through the switch fabric.

19. The specialized node of claim 14, wherein:
the ingress node is configured to support a plurality of different scheduling algorithms, each scheduling algorithm corresponding to an order of individually servicing one or more incoming flows;
for each serviced incoming flow in a selected scheduling algorithm, the ingress node generates a TDM packet from the serviced incoming flow for a corresponding TDM time slot in the TDM flow;

each TDM packet corresponding to a serviced incoming flow comprises:
  a switch-fabric header corresponding to the switch fabric protocol;
  a node header comprising a timestamp corresponding to a time that the TDM packet is generated and slot information identifying the serviced incoming flow; and
  one or more client packets corresponding to the serviced incoming flow; and each client packet is pre-pended by:
  a packet-length field indicate length of the client packet; and
  a timestamp corresponding to a time that the client packet was received at its ingress node.

20. A method comprising:

converting one or more incoming flows into a single, packetized, time-division multiplexed (TDM) flow;

routing the TDM flow via a fixed path through a switch fabric in a contention-free manner; and performing jitter compensation to convert the TDM flow received from the switch fabric into one or more outgoing flows corresponding to the one or more incoming flows, wherein at least one selected incoming data flow of the one or more incoming data flows is transmitted through the switch fabric with a jitter level that is guaranteed to be maintained within a specified jitter range.

* * * * *